May 9, 1950 C. CHISHOLM 2,506,703

KEY LOCKING MECHANISM FOR KEYBOARD CONTROLLED MACHINES

Original Filed July 20, 1946 10 Sheets-Sheet 1

INVENTOR.

CLIFTON CHISHOLM

BY Bates, Teare, & McBean

ATTORNEYS

May 9, 1950 C. CHISHOLM 2,506,703

KEY LOCKING MECHANISM FOR KEYBOARD CONTROLLED MACHINES

Original Filed July 20, 1946 10 Sheets-Sheet 2

INVENTOR
CLIFTON CHISHOLM
By Bates, Teare, & McBean
ATTORNEYS

INVENTOR.
CLIFTON CHISHOLM
BY Bates, Teare, & McBean
ATTORNEYS

May 9, 1950 C. CHISHOLM 2,506,703

KEY LOCKING MECHANISM FOR KEYBOARD CONTROLLED MACHINES

Original Filed July 20, 1946 10 Sheets-Sheet 4

INVENTOR.

CLIFTON CHISHOLM

BY Bates, Teare & McBean

ATTORNEYS

May 9, 1950 C. CHISHOLM 2,506,703

KEY LOCKING MECHANISM FOR KEYBOARD CONTROLLED MACHINES

Original Filed July 20, 1946 10 Sheets-Sheet 5

INVENTOR.
CLIFTON CHISHOLM
BY Bates, Teare, & McBean
ATTORNEYS

May 9, 1950 C. CHISHOLM 2,506,703

KEY LOCKING MECHANISM FOR KEYBOARD CONTROLLED MACHINES

Original Filed July 20, 1946 10 Sheets-Sheet 6

INVENTOR
CLIFTON CHISHOLM
BY Bates, Teare, & McBean
ATTORNEYS

INVENTOR
CLIFTON CHISHOLM
BY Bailey, Tearse & McLean
ATTORNEYS

May 9, 1950 — C. CHISHOLM — 2,506,703

KEY LOCKING MECHANISM FOR KEYBOARD CONTROLLED MACHINES

Original Filed July 20, 1946 — 10 Sheets-Sheet 8

INVENTOR.
CLIFTON CHISHOLM
BY
Bates, Teare, & McBean
ATTORNEYS

INVENTOR.
CLIFTON CHISHOLM
BY
Bates, Teare & McBean
ATTORNEYS

INVENTOR.
CLIFTON CHISHOLM
BY
Bates, Teare & McBean
ATTORNEYS

Patented May 9, 1950

2,506,703

UNITED STATES PATENT OFFICE 2,506,703

KEY LOCKING MECHANISM FOR KEYBOARD CONTROLLED MACHINES

Clifton Chisholm, Cleveland Heights, Ohio, assignor of one-fourth to Marie F. Chisholm, Cleveland Heights, and one-half to Henry C. Osborn, Cleveland, Ohio Original application July 20, 1946, Serial No. 685,107. Divided and this application May 29, 1947, Serial No. 751,304

2 Claims. (Cl. 197—107)

Figure 1:
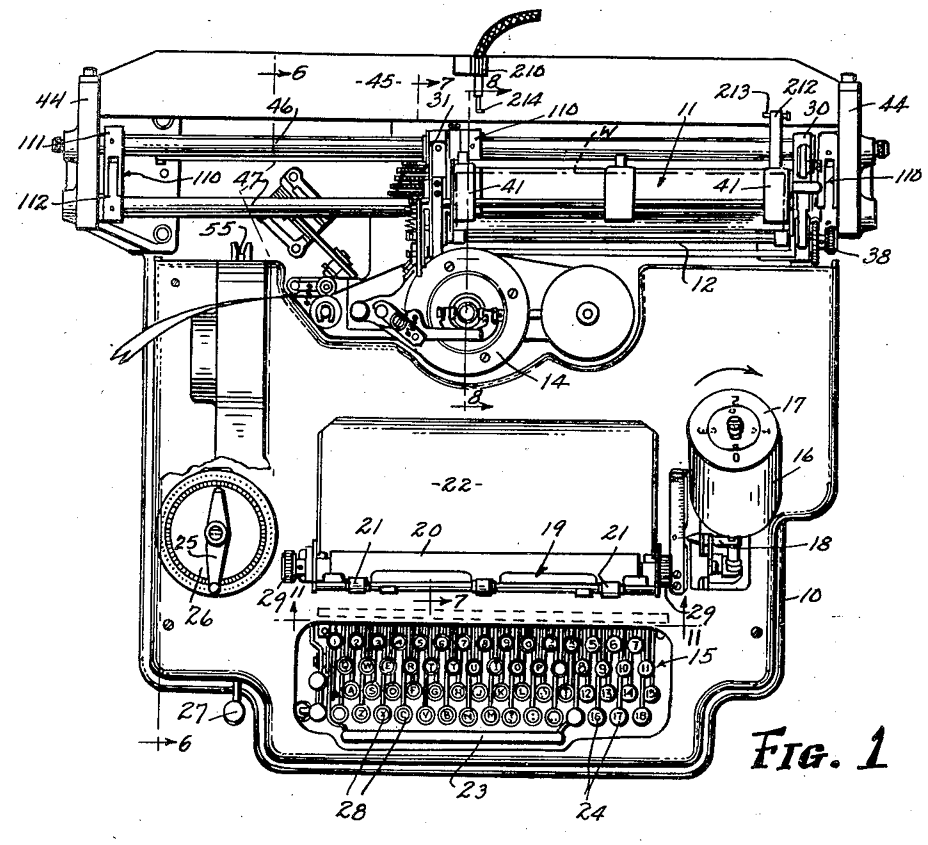

This application is a division of my copending application, Serial No. 685,107, filed July 20, 1946, on a Keyboard operated printing machine.

The present invention relates to improvements in key locking mechanisms for keyboard controlled machines, and more particularly to keyboard locking mechanisms for use with power operated, keyboard controlled, printing machines such as typewriters and the like. The present invention is especially concerned with mechanisms for preventing the operation of keys when such operation might result in damage to the various mechanisms controlled by such keys. These, therefore, are the general objects of the present invention.

My prior Patents Nos. 2,165,223; 2,165,224 and 2,165,225, issued July 11, 1939, as well as my copending application, Serial No. 685,107, heretofore mentioned, disclose keyboard machines of the general type to which the present invention is particularly applicable. In general, such a machine includes a plurality of individual letter keys for causing a copy to be reproduced as in an ordinary typewriter. However, a plurality of spacing keys are also provided. These space keys are arranged to space the words a varying distance from each other as, for instance, by any selected number of units from four to eighteen as desired. Further, the mechanism is arranged to utilize printing type of varying widths such as is ordinarily used in letter press printing.

In using a machine of the type mentioned, the operator first types a line in the usual manner, using a standard space key or bar. Mechanism, which is dependent upon the difference between the length of the typed line and the length of a standard line, is provided to indicate to the operator which space key or keys should be used when retyping the line to produce a justified or standard length line. This information is typed by the operator at the end of the line and subsequent lines are typed using the same procedure. To produce the justified copy, these typed lines are removed from the machine and retyped, using the space bars or keys indicated at the ends of the respective lines. The lines so retyped will all be of standard length. The retyped copy is then removed from the machine and utilized in any well known manner to form a master printing member or plate. For example, a planographic printing plate may be produced from the retyped copy by a photographic reproduction process.

One of the objects of the present invention is to provide an improved keyboard controlled, power operated, printing machine in which the actuation of the keys is prevented when the power is off.

A more specific object of this invention is to provide an electrically operated printing or typing machine, of the key controlled type, with a mechanism which will permit the actuation of keys by the operator only when the electric power is on.

A further object of the invention is to provide a machine of the general type heretofore mentioned with a mechanism to prevent the actuation of the controlling keys so long as the power is in an off position.

Another object of this invention is to provide a power operated, key controlled machine with an improved form of mechanism for preventing the actuation of more than one key at a time.

Other objects and advantages of the present invention will become more apparent from the following description, reference being had to the accompanying drawings in which there is illustrated a preferred embodiment of the invention. The essential characteristics of the invention will be summarized in the claims.

Figure 15:
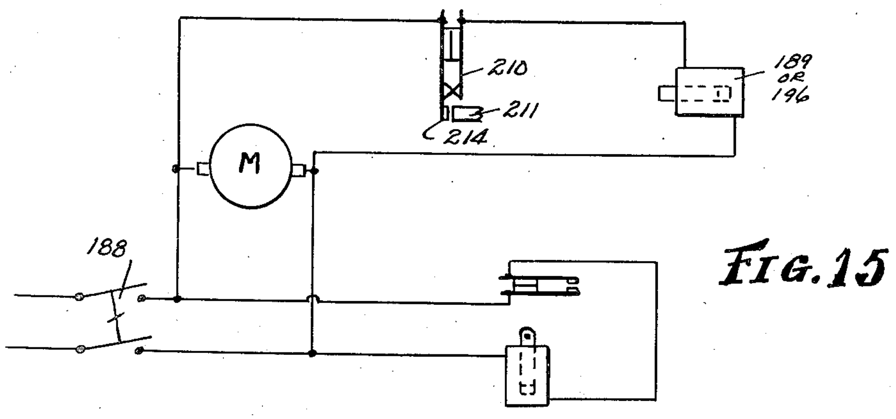
Figure 2:
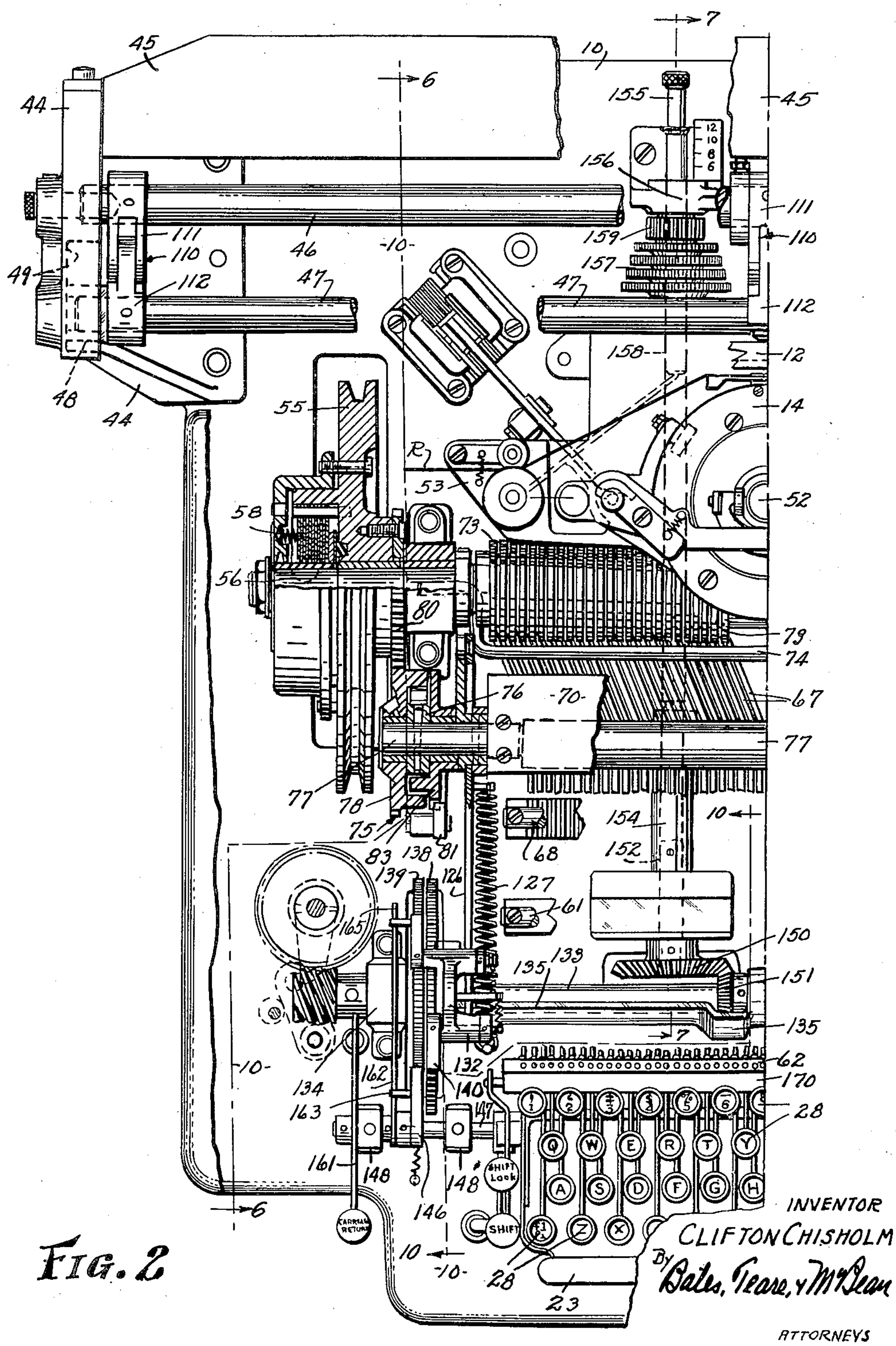
Figure 3:
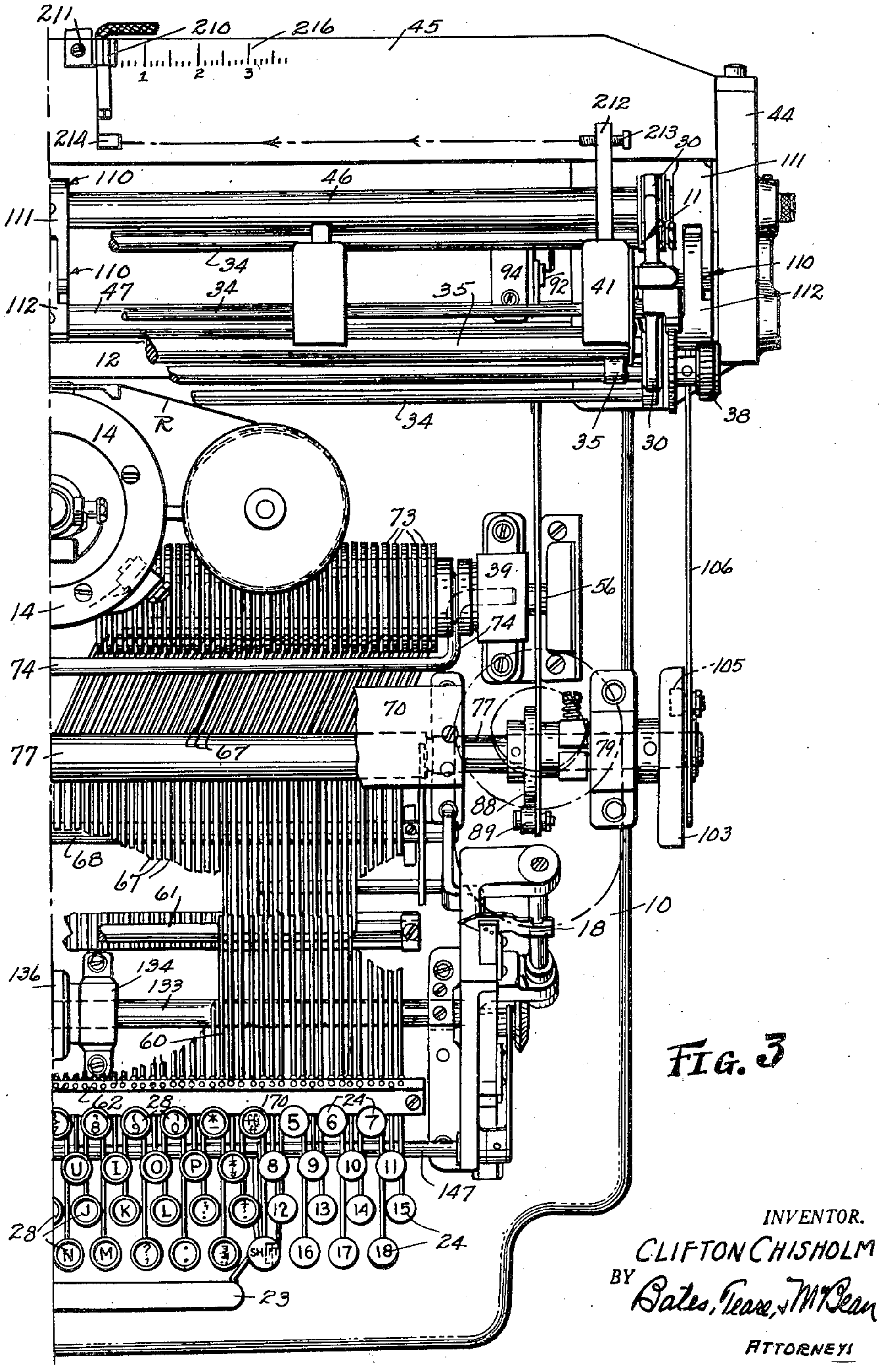
Figure 4:
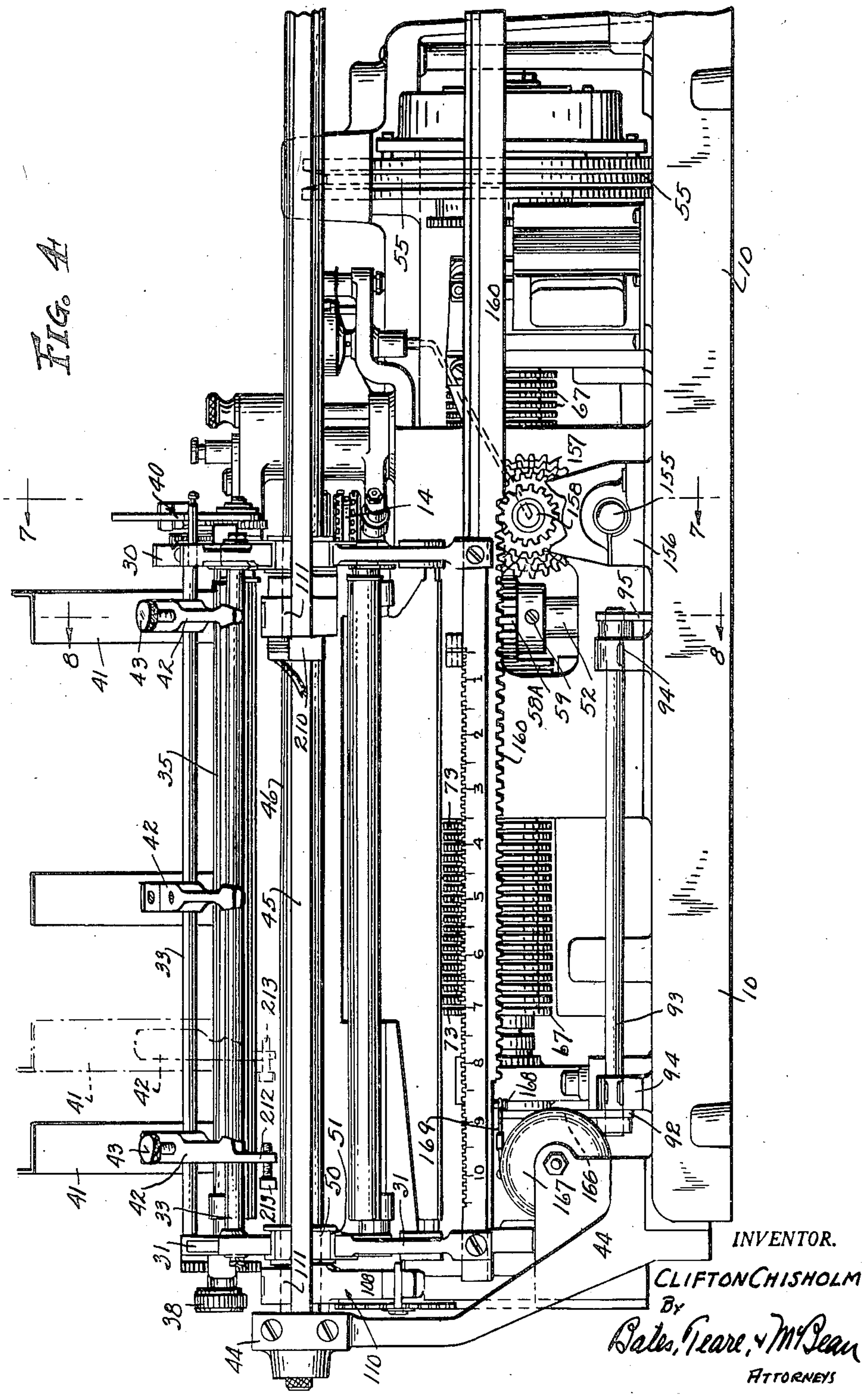
Figure 5:
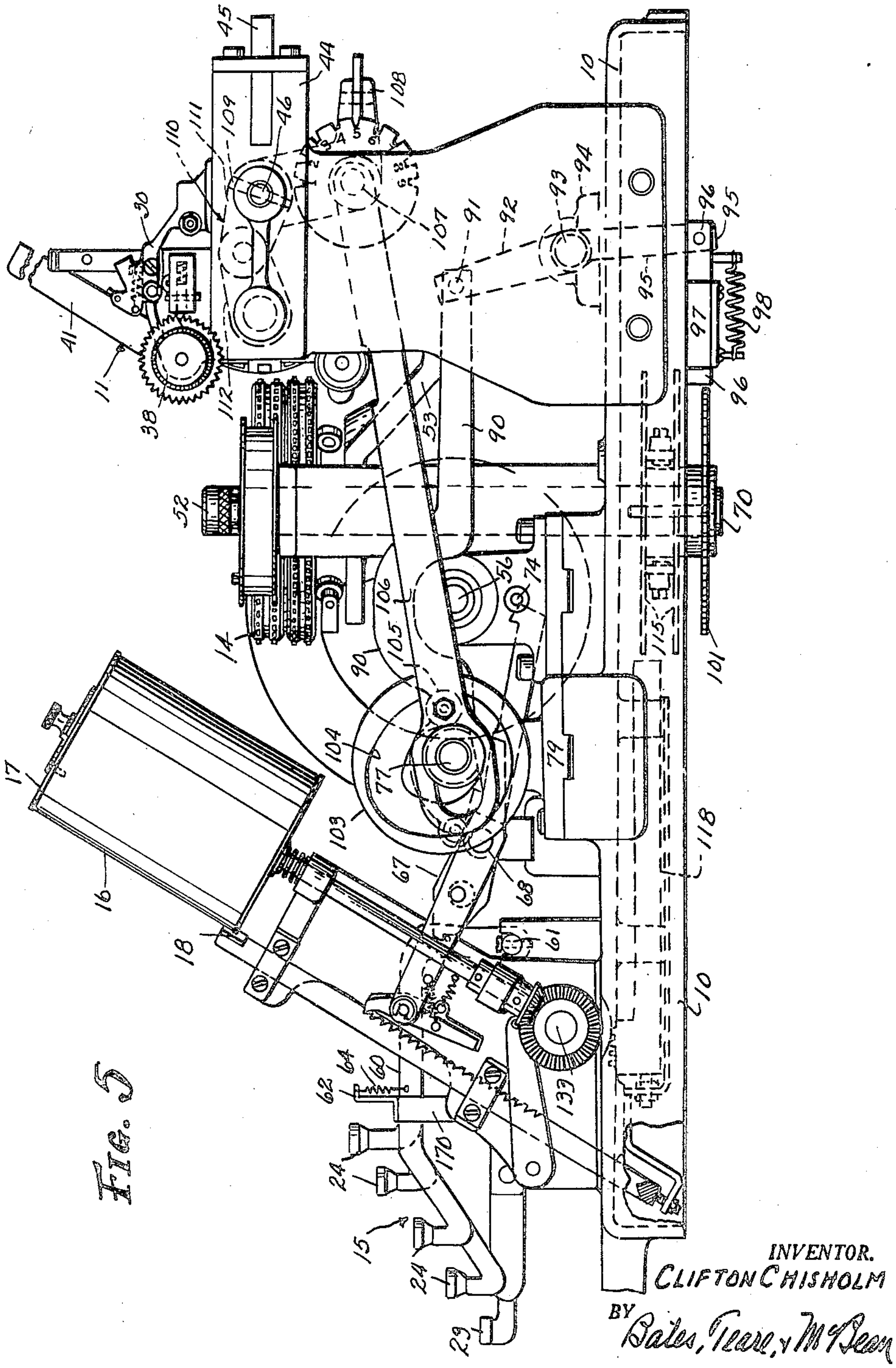
Figure 6:
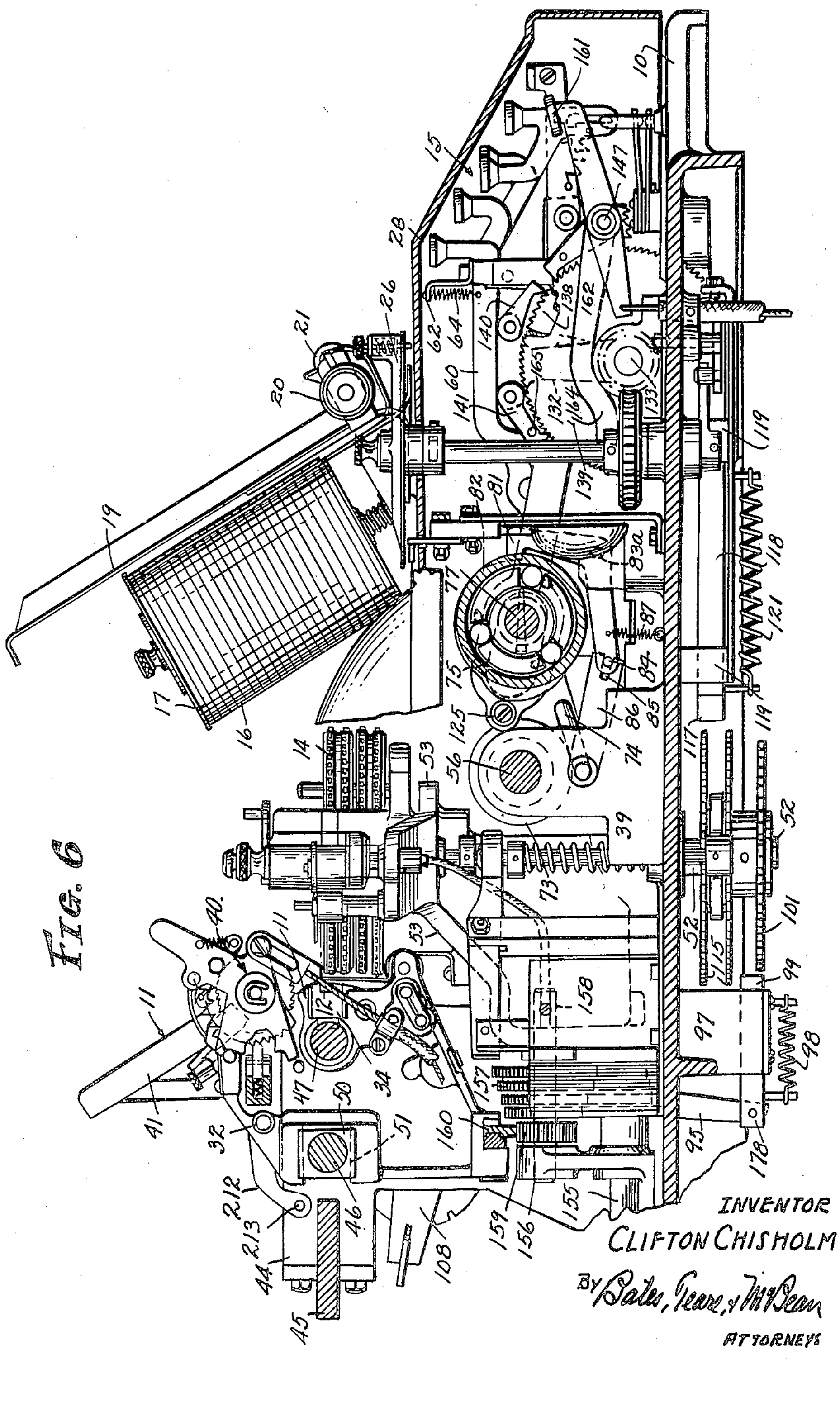
Figure 7:
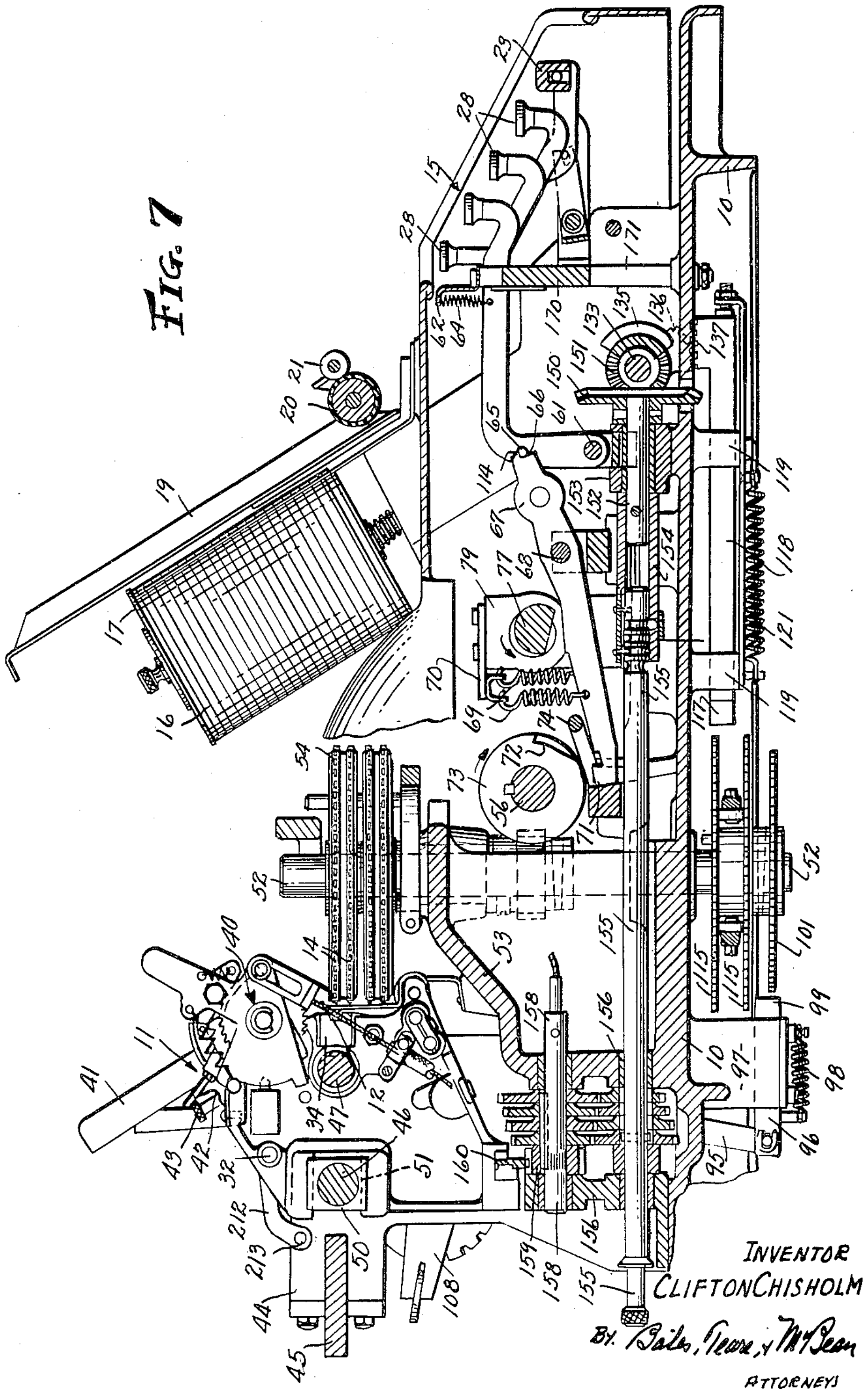
Figure 8:
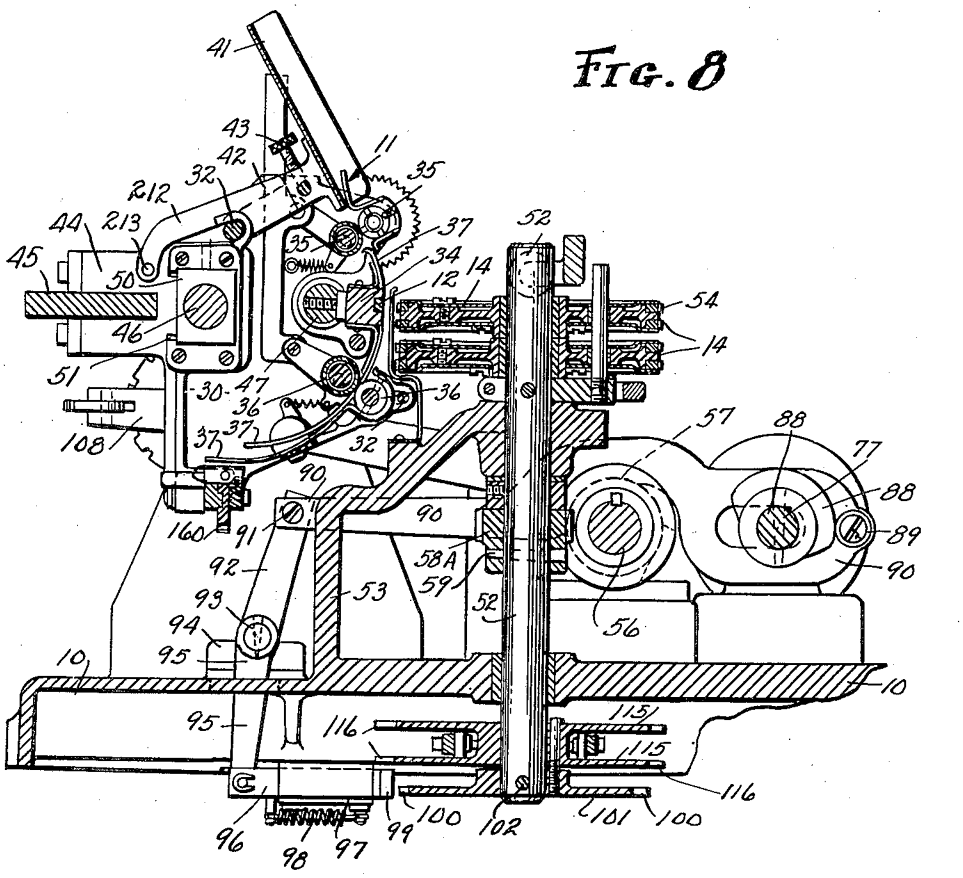
Figure 9:
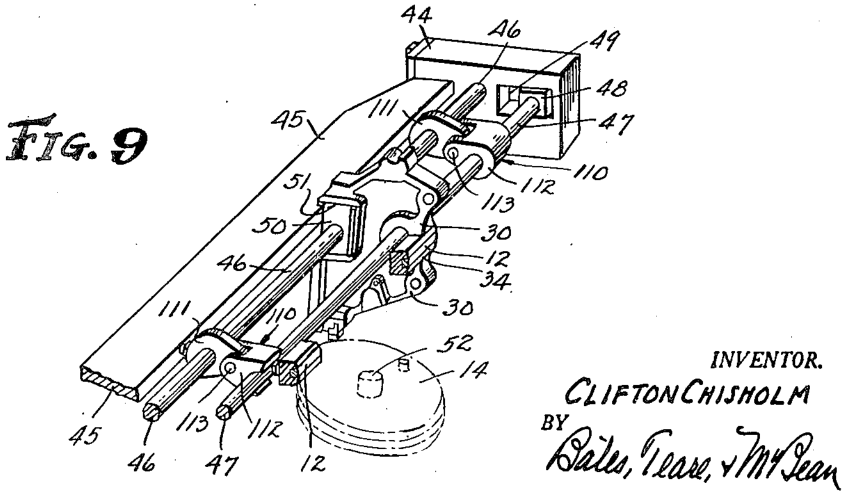
Figure 10:
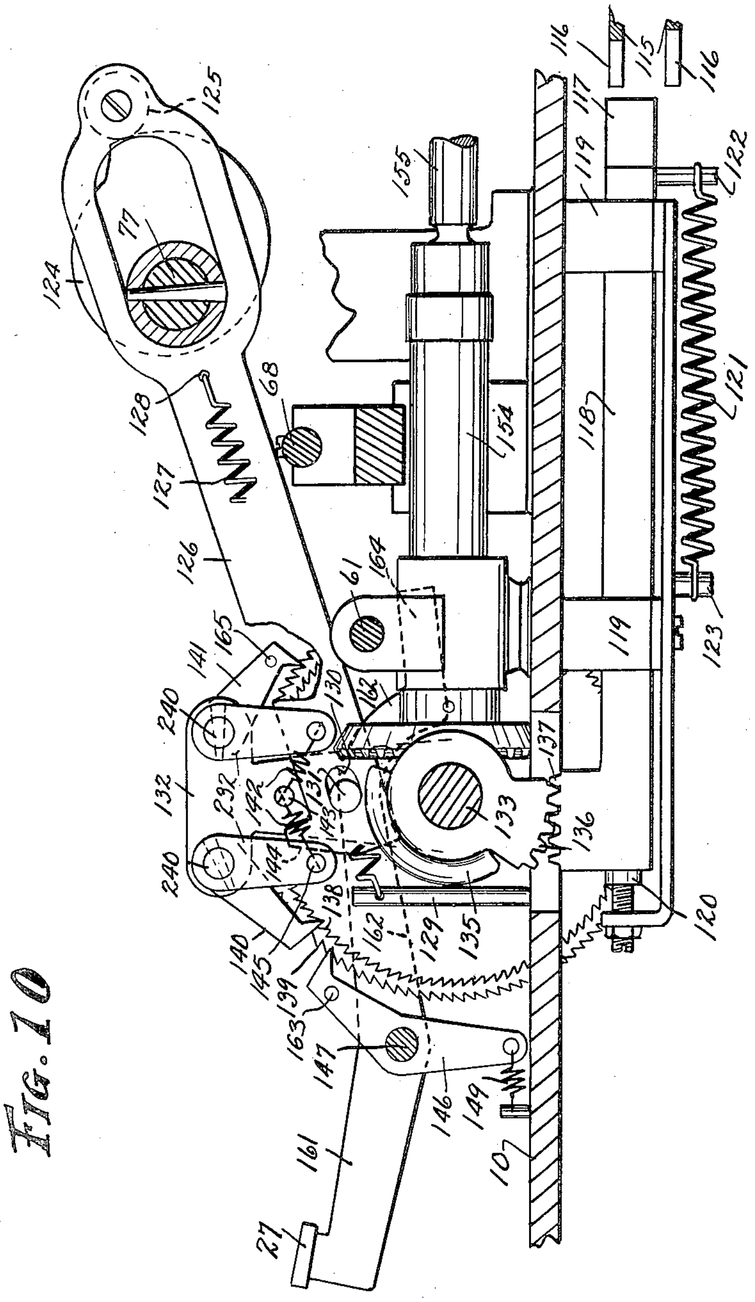
Figure 11:
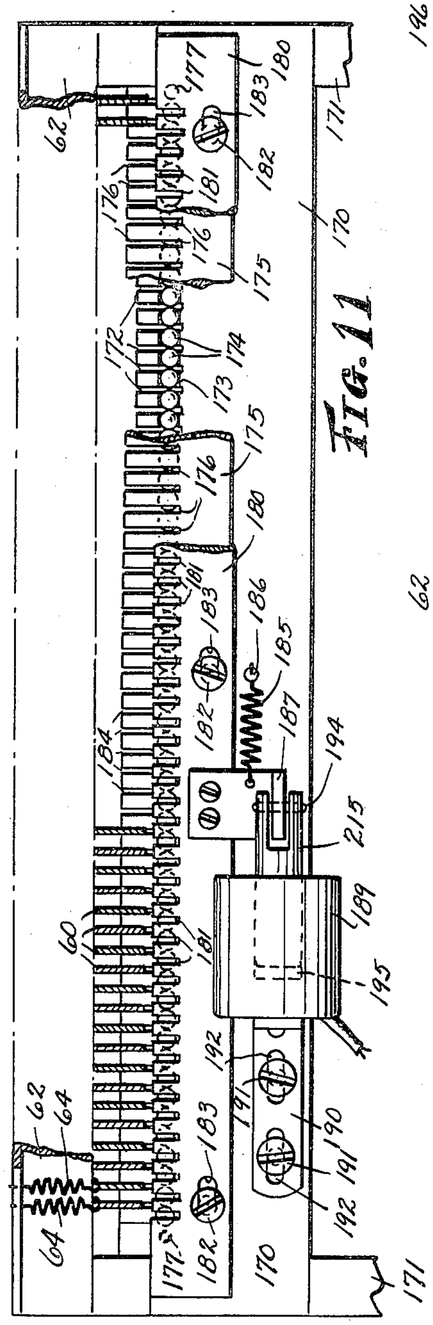
Figure 14:
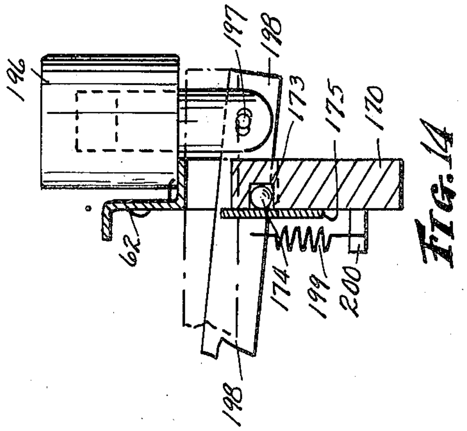
Figure 13:
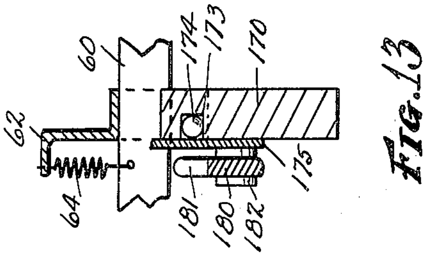
Figure 12:
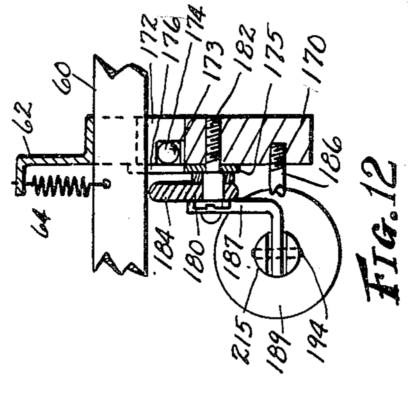

In the drawings, Fig. 1 is a plan view of a machine embodying my invention; Fig. 2 is an enlarged plan view of the left hand side of the machine, the cover and certain other parts being broken away to more clearly illustrate the internal construction; Fig. 3 is a plan view similar to Fig. 2 but illustrating the right hand side of the machine; Fig. 4 is a rear elevation of the machine; Fig. 5 is a side elevation looking at the right hand side of Figs. 1 and 3; Fig. 6 is a longitudinal vertical section, the plane of the section being indicated by the lines 6—6 on Figs. 1 and 2; Fig. 7 is a longitudinal vertical section as indicated by the lines 7—7 on Figs. 1, 2 and 4; Fig. 8 is a fragmentary vertical section through the type wheels and associated mechanism, the plane of the section being indicated by the lines 8—8 on Figs. 1 and 4; Fig. 9 is a fragmentary perspective view and illustrates a portion of the paper carriage together with portions of its supporting and actuating mechanisms; Fig. 10 is a sectional detail on an enlarged scale, illustrating a ratchet mechanism for controlling the progress of a paper carriage and justification chart, the plane of the section being substantially indicated by the offset line 10—10 on Fig. 2; Fig. 11 is a sectional detail, certain parts being broken away, of a mechanism for preventing the simultaneous depression of a plurality of keys and for preventing the depression of any key when the power is off, the plane of the section being indicated by the lines 11—11 on Fig. 1; Figs. 12 and 13 are sectional details as indicated by the correspondingly numbered lines on Fig. 11; Fig. 14 is a sectional detail similar to Fig. 12 but illustrating a modified form of the invention; Fig. 15 is an electrical diagram illustrating an electrical circuit for the machine.

The present invention is illustrated in connection with the keyboard operated machine of my copending application, Serial No. 685,107, and reference may be had to such application for a more complete description thereof.

Referring to Fig. 1 of the present application, it will be seen that such improved keyboard controlled printing machine comprises a frame 10 which supports a paper carriage 11. The paper carriage is progressed across the frame from right to left by a suitable variable feed mechanism, and is arranged to carry a platen 12 and a work sheet so that the latter may be line spaced. The variable feed mechanism illustrated forms the subject of my copending application, Serial No. 751,303.

A series of type wheels 14 are mounted on the frame 10, for rotation as a unit about a vertical axis. Each type wheel 14 carries an entire font of type. One wheel, for instance, may carry 6-point type, another 8-point type, another 10-point type, etc. The wheels are arranged to be selectively positioned, relative to the platen 12, to enable use of the desired font of type by a mechanism which forms the subject of my copending application, Serial No. 752,995. A keyboard 15 controls the rotation of the type wheels so as to bring the desired type of a selected font into printing position. The keyboard 15 also controls a mechanism which causes the paper carriage 11 to move bodily toward the type wheels 14 to cause an impression to be made of the selected character or type. Such mechanisms are included in the subject matter of my copending application, Serial No. 685,107.

Following the impression of a character on the work sheet, the paper carriage 11 is moved from right to left a distance which is determined by the width of the character last impressed. The total number of spaces between the words of a printed line, and the total distance the work sheet is advanced, controls the relative positions of a justifying scale 16 carried by a drum 17 and an indicator or pointer 18. The drum 17 and indicator 18 are mounted at the right hand side of the machine in front of the paper carriage.

To facilitate the operation of the mechanism, a copyholder, generally indicated at 19, is positioned between the keyboard 15 and the type wheels 14. This copyholder may comprise coacting rollers 20 and 21 between which a sheet to be copied is placed. It also may include a suitable copy support or guide 22. The arrangement is such that the operator may rotate the roll 20 by means of knobs 29 to bring the desired line of the copy into position where it is readily visible by the operator.

In making the initial impression, the operator first determines the length of the lines to be printed and sets an indicator 25 on an em scale 26 to indicate such length in ems. This scale is automatically advanced as the line is typed, and a signal, such as the ringing of a bell, is given to the operator as will be hereinafter more fully described. This signal is arranged to inform the operator when a point a fixed distance from the end of the desired length of line has been reached and thereby give the operator opportunity to determine how much more may be typed without overrunning the line.

During the first typing or printing of the copy, the operator uses a space bar or key 23 of the keyboard 15 to cause the paper carriage to be advanced for word spacing. Each time this space bar is actuated it causes the carriage to be advanced a predetermined distance, which, in the construction illustrated, is four units. Each time a character key 28 is actuated, the carriage 11 is advanced a number of units equivalent to the width of the type selected by the actuation of such key.

The keyboard 15 is also provided with a plurality of justifying space keys 24 each of which, when actuated, causes the carriage to be advanced a different number of units. In the form illustrated the keys are arranged to advance the carriage any desired number of units from five to eighteen inclusive.

The operator, during the initial typing, causes the typed line to approach the desired length as nearly as possible and then reads the scale 16. At this time the indicator 18 is opposite indicia on the scale 16 which will indicate which space key or keys 24, if used instead of the space bar 23, in retyping for word spacing, will cause the typed line to be justified or extended to a length equal to the length of line desired for the finished copy. This designation is then typed at the end of the line.

Following the typing of the justification indicia at the end of a typed line the operator depresses a release key 27. The depression of this key causes the paper carriage 11 to be returned to its right hand or starting position, advances the work sheet on the carriage 11 to position it to receive the next line to be printed, causes the em scale 26 to return to its zero or starting position, and causes the justifying scale 16 and indicator 18 to return to their starting positions. Thus the machine is made ready for the typing of the next line.

After all lines of a page have been typed or printed, the initial copy is removed from the carriage 11 and placed in the copyholder 19, and the sheet is then retyped. During this retyping the words are spaced by the keys 24 designated by the indicia at the end of the respective lines. The retyped page is thus justified and simulates a letter press impression.

The work sheet or paper carriage 11 and the platen 12 are best illustrated in Figs. 1, 3, 4, 5, 6 and 8. As there illustrated, the paper carriage 11 comprises a pair of end plates 30 and 31, spaced apart by cross frame members, such as rods 32 and bars 33 and 34, all of which are secured at their ends to the end plates. The frame member or bar 34 is positioned at the front of the carriage and is provided with a longitudinally extending, forwardly facing groove in which a plastic bar, which comprises the platen 12, is fixedly seated.

Mounted above the platen 12 are a pair of coacting work sheet guide rollers 35 (Fig. 8), while a similar set of rollers 36 are mounted below the platen. A work sheet is passed between and gripped by the pairs of rollers 35 and 36 and held tightly against the platen thereby. Suitable plate-like guide members 37 are provided to guide the work sheet and prevent undesired contact between it and various parts of the mechanism.

As indicated in the drawings, the work sheet may be fed upwardly for line spacing by rotating one of the rollers 35 which is provided with a knob 38 (Fig. 1).

The work sheet may be advanced by a ratchet mechanism generally indicated at 40 in Figs. 4, 6 and 7. This ratchet mechanism is similar to that used on typewriters. Suffice it to say that it is operated to advance the work sheet a line at a time consequent upon the actuation of the release key 27 by the operator.

The work sheet is positioned lengthwise of the carriage by end guides 41 carried by supporting brackets 42 which, in turn, are mounted on a pair of rods 32 heretofore mentioned. At least the right hand guide 41 (Fig. 1) is adjustable lengthwise of the carriage and may be secured in an adjusted position by a set screw 43 (Fig. 4). The other end guide 41 may be permanently or adjustably positioned as desired, but when once accurately positioned, need not be changed.

The paper carriage 11 is mounted for movement from right to left (Fig. 1) transversely across the machine. As shown in the drawings, particularly in Figs. 1 to 6, the frame 10 of the machine is provided with a pair of upstanding side brackets 44 which have their bases rigidly connected to the frame 10 and which are connected adjacent their upper ends by a comparatively rigid reenforcing bar 45. This bar 45 extends between the brackets in substantially the same horizontal plane as the platen 12. Also mounted in substantially the same horizontal plane as the reenforcing bar 45 and the platen 12, are a pair of comparatively heavy rods 46 and 47. As indicated in Figs. 6, 8 and 9, the rod 46 is mounted in the frame standards 44 for rotation about a fixed axis relative thereto. The rod 47 is mounted or secured to guide blocks 48 which are slidably mounted in horizontally extending ways 49 formed in the brackets 44. Thus the rod 47 may be reciprocated toward and from the platen 12 in a substantially horizontal plane.

The paper carriage is mounted on the rods 47 and 48 for movement axially thereof. As indicated in Figs. 8 and 9 the carriage end plates 30 and 31 are slidable axially along the rod 47 which is journaled in such plates. Journaled on, and slidable axially of the rod 46, are a pair of blocks 50 which are mounted in ways 51 formed in respective carriage end members 30 and 31. Thus the carriage may move or reciprocate horizontally relative to the bar 46 the axis of which is fixed relative to the frame brackets 44. This reciprocation of the carriage is used to effect the printing operation.

The type wheels 14 are best shown in Figs. 1 and 8. In the present embodiment I have illustrated a plurality of type wheels 14, each of which is mounted on a shaft 52. This shaft is mounted in a frame bracket 53. Mechanism is provided to selectively utilize any desired type wheel. However, as such mechanism is not required for full knowledge of the present invention, the operation will be explained in connection with the uppermost type wheel 14. Suffice it here to say, that the wheel carries an annular set or band 54 of type on its periphery. This band of type lies in substantially the same horizontal plane as the platen 12. The wheel is so connected with its supporting shaft as to rotate as a unit therewith.

When the machine is in operation the type wheels are continuously rotated, the rotation being stopped for the printing operation under the control of the keyboard 15. The type wheels are normally rotated by a motor M (Fig. 15) which may be drivingly connected by a suitable V-shaped driving belt, not shown, with a drive pulley 55 best shown in Fig. 2. This pulley is rotatably mounted on a shaft 56 which extends transversely across the frame 10 being journaled in suitable bearings 39. A friction clutch 58 is interposed between the pulley 55 and the shaft 56.

This clutch permits the rotation of the shaft to be stopped for the printing operation without stopping the rotation of the drive pulley 55. As such clutches are well known, no detailed description will be given. Secured to the shaft 56, intermediate its ends, is a gear 57 which meshes with a gear 58A drivingly secured to the type wheel shaft 52 as by a pin 59.

The depression of a letter key 28 stops the rotation of the type wheel 14 with the selected type in printing position, while the depression on the space bar 23 or a space key 24 stops the type wheel 14 with a portion thereof either having no characters or having quads in printing position. The mechanism for accomplishing this is best shown in Figs. 2, 3, 6 and 7. As shown, in Fig. 7, each key 28 or 24, as well as the space key or bar 23, is secured to a respective key lever 60. These levers are pivoted to a stationary shaft 61.

The key levers 60 are normally held in their uppermost position, against a stop bar 62 carried by frame members or posts 171, by individual springs 64. Each key lever 60 carries a pin 65 which is normally in latching engagement with a notch 66 formed in the end of a respective lever 67. The levers 67 are pivoted to a stationary rod 68 extending across the frame 10, and are normally retained in the position shown in Fig. 7 by individual springs 69 which are interposed between the respective levers 67 and a frame bar 70.

When the operator depresses a key 28, 24, or the bar 23, the respective key lever 60 is rocked clockwise against the action of its spring 64 to a position where its pin 65 is withdrawn from the notch 66 in the respective lever 67, whereupon a spring 69 rocks such lever 67 clockwise about its pivot shaft 68, causing a lug 71 on the end of such lever to engage a notch 72 in a disc 73. There are a plurality of such discs, one for each lever 67. The discs 73 are keyed to the main drive shaft 56 so that their notches 72 are spaced circumferentially one from the other. Thus each disc will stop the rotation of the shaft 56 and the type wheel 14 in a different circumferential position. Accordingly, any selected character of the band 54 of the type may be brought into printing position relative to the platen 12.

The depression of a key 23, 24 or 28 also causes the carriage 11 to move bodily toward the type wheels 14 to cause an impression to be made on the work sheet W. As shown in Figs. 2, 3, 6 and 8, the rocking of a lever 67, as a result of the depression of a key, causes such lever to engage a bail 74 the ends of which are pivoted in the bearing members 39 heretofore described. The movement of the bail 74 controls a single revolution clutch generally indicated at 75 in Figs. 2 and 6. The driving member 76 of this clutch is secured to a cam shaft 77 mounted on the frame 10 in bearings 79. The driven member 78 of the clutch 75 is rotatably mounted on the shaft 77 and is drivingly connected by gearing 80 with the constantly rotating drive pulley 55 heretofore described. The single rotation clutch may be of any well known make, and hence is not described herein in detail. Suffice it to say that the shaft 77 will rotate consequent upon the withdrawing of a latch 81 from a notch 82 in a clutch control member 83 (Fig. 2) whereupon the shaft 77 will make one complete revolution following which the latch 81 will again engage the notch 82 and disengage the driving connection.

The latch 81 of the single revolution clutch 75 is in the form of a bell crank and is pivoted intermediate its ends as at 83a to a suitable frame bracket. The latch 81 carries a pin 84 engaged by a slot 85 in a lever 86 which, as indicated in Fig. 6, is secured to the bail 74. A spring 87, interposed between the latch 81 and the frame 10, serves to restore the latch 81, the bail 74, and their associated parts to their normal position, shown in Fig. 6. The action of the spring 87 is such that it may be readily overcome by the action of any of the springs 69 heretofore described.

The movement of the shaft 77 locks the type wheels 14 with the selected character in printing position prior to the making of an impression therefrom. As shown in Figs. 3, 5 and 8, a cam 88 is secured to the shaft 77 and is arranged to coact with a roller 89 carried by one end of a link 90, the other end of which is pivotally connected at 91 with a lever 92. The lever 92 is secured to a shaft 93 which is journaled in suitable bearings 94 carried by the frame, and which carries a lever 95. This lever actuates a bolt 96 slidably mounted in a guideway 97 carried by the frame 10. As the cam 88 rotates, a spring 98 interconnected between the bolt and the guide 97 brings a V shaped nose 99 of the bolt into locking engagement with one of a plurality of notches 100 in a disc 101 which is secured as by a pin 102 to the lower end of the type wheel shaft 52. Following the making of the impression, hereinafter to be described, continued rotation of the cam 88 actuates the bolt 96 moving it against the action of the spring 98 and disengaging it from the disc 101.

Continued movement of the cam shaft 77, following the locking of the type wheels 14, causes the carriage 11, together with the work sheet carried thereby, to move bodily against the type wheel 14, thus making an impression through a suitable ribbon R on the work sheet W of the selected type. As illustrated in Figs. 3 and 5, a cam disc 103 is secured to the right hand end of the shaft 77. This disc has a cam groove 104 arranged to be engaged by a roller 105 carried by a link 106. The link is in turn pivotally connected, as at 107, with a lever 108 which is secured as by a pin 109 to the shaft or rod 46 heretofore described as being one of the rods which supports the paper carriage 11.

Interconnected between the rod 46 and the other paper carriage supporting rod 47 are a plurality of toggles 110. Each toggle, Figs. 5 and 9, comprises a link 111 which is secured to the rod 46, and a second link 112 which is pivotally connected to the first link by a pivot pin 113, and which is pivotally connected to the rod 47. As shown in Figs. 1, 2 and 3, there are three such toggles, one at each end of the rods 46 and 47 adjacent the frame brackets 44, and one in substantially the longitudinal center of such bars, the latter toggle being substantially in alignment with the axis of the type wheels 14. The rod 46 is mounted in the frame members 44 so that its axis remains fixed, accordingly clockwise movement (Fig. 9) of the rod 46 causes the toggles to straighten, forcing the rod 47, and accordingly the carriage 11, toward the type wheels 14 to cause an impression to be made.

The rotation of the cam shaft 77 automatically restores the depressed key lever 60 to its normal position in latching engagement with its respective lever 67. As shown in Fig. 7, the central portion of the shaft 77 is in the form of an elongated cam which, after the impression has been made, engages the lever 67, which was swung clockwise by its spring 64 following the depression of the corresponding key. The cam thus moves the lever 67 against the action of its spring 64 to the position shown in Fig. 7. As the lever 67 returns to its normal position a cam portion 114 on the right hand end of the lever engages a pin 65 and rocks the associated key lever 60 a distance sufficient to permit the spring 64 to cause the pin to reengage the notch 66 in the lever 67 thus latching the levers together.

The rotation of the shaft 77 also progresses the paper carriage 11, such movement being under control of a variable feed or ratchet mechanism shown in Figs. 2, 6 and 10. This variable feed mechanism forms the subject of my copending application, Serial No. 751,303, and is arranged to cause the paper carriage 11 to be advanced a distance commensurate with the width of the type from which the last impression was made. This type of advancement of the carriage produces a copy which simulates letter press work.

The distance the paper carriage 11 is to be advanced, is determined by a notched disc 115 which is mounted on the lower end of the type wheel shaft 52 for rotation as a unit therewith. As the shaft 52 is rotated to bring a specific type character or space quad into printing position, the notch 116, of the disc 115, corresponding to such character or space quad, is brought into alignment with a spur 117 carried by a plunger or justifying bar 118. This bar is mounted for reciprocation in suitable brackets 119 formed on the under side of the frame 10. The plunger 118 is normally held in a retracted position against an adjustable stop 120 (Figs. 6 and 10) by a spring 121 interconnected between a pin 122 carried by the plunger and a pin 123 carried by a relatively stationary member.

The rotation of the shaft 77 during the making of the impression releases a mechanism which causes the plunger 118 to be urged forward yieldingly until the end 117 thereof seats in the notch 116 of the disc 115 which at that time is aligned therewith. As shown in Fig. 10, a cam 124 is pinned to the shaft 77. While the impression is being made the shaft 77 moves this cam out of contact with a roller 125 carried by a link 126, whereupon a spring 127 draws the link to the left (Fig. 10). This spring is interconnected between the link 126 as at 128, and a pin 129 carried by the frame 10.

As the link 126 moves to the left, under impulse of the spring 127, the end of a slot 130 in the link 126 engages a pin 131 carried by a pawl carrier 132 which is pivotally mounted on a shaft 133 journaled in suitable bearings 134 (Figs. 2 and 3) carried by the frame 10 and swings the carrier from the position shown in Fig. 10 in a counterclockwise direction. The pawl carrier 132 is connected by an elongated segment 135 (Figs. 2 and 10), with a segmental gear 136 journaled on the shaft 133, and the teeth of which engage a rack-like formation 137 on the left hand end of the justifying bar 118. It is thus obvious that the depth of the notch controls the amount of movement of the justifying bar 118 as well as the extent of movement of the pawl carrier 132.

The pawl carrier 132 advances a pair of ratchet wheels 138 and 139. As shown in Fig. 10, the pawl carrier 132 carries two pawls, namely, the pawls 140 and 141. The pawl 140 normally engages the ratchet wheel 138 which is drivingly secured to the shaft 133. This pawl prevents rebound or counterclockwise movement of the ratchet wheels.

The pawl 141 normally engages a ratchet wheel 139, which is secured to the ratchet wheel 138. The pawl 141, consequent upon the completion of the rotation of the shaft 77, engages the ratchet wheel 139 and advances the ratchet wheels a distance commensurate with the depth of the notch 116 which was engaged by the bar 118.

The ratchet wheels 138 and 139 are preferably of the same diameter and are provided with an identical number of teeth, each tooth representing one unit of type width. For clearness of illustration the two ratchet wheels 138 and 139 are shown in Fig. 10 as having different diameters.

The pawls 140 and 141 are secured to respective pins 240 which are journaled in the pawl carrier 132, and each of which is provided with a lever 232. These levers are connected by respective springs 142 with a pin 143 carried by the pawl carrier 132 to thereby normally retain the pawls in engagement with their respective ratchet wheels. As the link 126 moves in a left hand direction (Fig. 10), it has no immediate effect on the pawl carrier 132. but instead the end 144 of the link engages a pin 145 carried by the lever 132 of the pawl 140 and rocks the pawl 140 out of engagement with its ratchet wheel 138. Following the release of the pawl 140, the link 126 picks up the pawl carrier, by reason of the pin and slot connection 131, 130 with the pawl carrier heretofore described. During the movement of the pawl carrier, under the influence of the spring 127, a detent pawl 146 pivotally mounted on a shaft 147 journaled in frame brackets 148 (Fig. 2) prevents counterclockwise movement of the ratchet wheels. This pawl is normally drawn into engagement with the ratchet wheel 139 by a spring 149 interconnected between an arm of the pawl and a pin which is secured to the frame 10.

As heretofore mentioned, the pawl 140 acts to prevent overthrow of the ratchet wheels 138 and 139. As the link 126 moves to the right (Fig. 10) under the impulse of the cam 124, it first moves out of engagement with the pin 145 thereby permitting the spring 142 to draw the pawl 140 into contact with the ratchet wheel 139. Thus any counterclockwise movement or rebound of the ratchet wheels is prevented.

The arcuate movement of the shaft 133 is transmitted to the carriage 11 to advance it a distance equivalent to the width of the type character last impressed. The mechanism for transmitting this movement is best illustrated in Figs. 2, 4, 6 and 7. As there shown, a beveled gear 150 is drivingly secured to the shaft 133 and meshes with a beveled gear 151 drivingly secured to a stub shaft 152 (Fig. 7). This stub shaft is journaled in a bearing 153 carried by the frame 10 and is drivingly secured to a sleeve 154. Drivingly connected to this sleeve as, for instance, by a spline is a coaxial shaft 155. This shaft is journaled in bearings 156 and is connected as, for instance, by gearing generally indicated at 157 with a counter shaft 158 which carries a pinion 159 meshing with a rack 160 carried by the paper carriage 11. Thus the movement of the shaft actuates the paper carriage.

The em scale 26 and the justification chart or scale 16 are also controlled by the shaft 133. Reference may be had to my copending application, Serial No. 685,107, for a complete description of the functions of these scales as well as the operating connections between the scales and the shaft 133.

The release key 27 returns the em scale 26, the chart 16 and the carriage 11 to their zero or starting positions. This key is best shown in Figs. 2, 3, 5, 6 and 10. As shown in Fig. 6, the release key 27 is mounted on a key lever 161 which is fixed to the shaft 147. Also fixed to the shaft 147 is a bar 162 which normally lies in the position shown in Figs. 6 and 10. When, however, the key 27 is depressed, the bar moves counterclockwise (Fig. 10). As the bar moves, it engages a pin 163 carried by the detent pawl 146 for the ratchet wheel 139 heretofore described, moving this detent out of coaction with the ratchet wheel. At the same time the outermost end 164 of this bar 162 (Fig. 6) engages a pin 165 on the pawl 141 raising it out of engagement with the ratchet wheel 139, whereupon a spring 166 (Fig. 4) returns the ratchet wheels and the shaft 133 to their original or starting positions. The spring 166 is mounted in a housing 167 secured to a frame bracket 44 and is connected with a pin 168 carried by the rack 160 of the carriage 11 by a flexible connecting member 169. This spring acts to return the carriage to its original position (to the left in Fig. 4, or to the right in Figs. 1, 2 and 3). This movement of the carriage through the gearing 156, the shafts 155, 152, and 133 restores the ratchet wheels 138 and 139 to their starting positions, and, as explained in my copending application, Serial No. 685,107, such movement also restores the em scale 26 and the justifying scale to their zero or starting positions.

One of the features of the present invention is the mechanism whereby depression of more than one key at a time is prevented. As illustrated in Figs. 11, 12 and 13, all of the key levers 60 pass through individual notches in a guide plate or bar 170 which extends between frame posts 171 immediately to the rear of the keyboard as indicated by the dotted lines in Fig. 1. This bar or guide is provided with a notch 172 for each key lever. The key levers 60 are normally drawn upward in contact with the stop bar 62 extending thereacross by springs 64, as heretofore described. The lower portions of the key levers, however, extend into the respective notches 172. The bar 170 has an elongated groove or channel 173 in which a series of balls 174 are positioned. The balls are held in their position by a comb 175 secured to the guide plate and having notches 176 corresponding to the notches 172 in the guide 170. The balls 174 are so spaced in the groove 173 that the depression of a key lever separates two of the balls a distance equivalent to the width of such lever. As the length of the groove is limited as, for instance, by pins 177 at either end thereof, the depression of one key lever completely fills the channel. The depression of a second key lever to an extent to release the latch 66 between the key lever and its associated lever 67 is prevented by contact with coacting balls 174.

Another important feature of the present invention is the arrangement whereby a key cannot be operated so long as the power is off. As illustrated in Figs. 11 and 12, a comb 180 having notches 181, similar to the notches 172 and 176 in the guide 170 and the guide comb 175, is mounted for longitudinal reciprocation on the bar 170, as for instance, by screws 182 carried by the guide 170 and passing through slotted openings 183 in the comb 180. Normally, a spring 185 holds the comb 180 in the position indicated in Fig. 11 with the teeth 184 thereof aligned with the notches 172 and 176 in the guide 170 and guide comb 175. The spring 185 is interposed between a pin 186 on the guide and a bracket 187 carried by the comb 180. Thus, when the comb 180 is in its normal position, the teeth thereof prevent the depression of any key lever 60. When, however, an electrical switch 188 (Fig. 15) is closed to energize the motor M, which is drivingly connected to the main drive pulley 55 as heretofore mentioned, a solenoid 189 (Figs. 11 and 12) is energized.

The solenoid 189 is secured to a bracket 190 which, in turn, is adjustably mounted on the guide member 170 as, for instance, by screws 191 passing through slotted openings 192 in the bracket 190 and engaging suitable threaded openings in the guide 170. The movable core 215 of this solenoid 189 is connected with the bracket 187 as, for instance, by a pin 194. When the solenoid 189 is energized the comb 180 is moved to the left (Fig. 11) a distance equivalent to the width of the gap 195 in the solenoid. This moves the notches 181 of the comb 180 into registration with the slots 172 and 176 heretofore described, thus permitting the depression of a key only when the motor is supplied with power.

In Fig. 14, I have illustrated a modified form of mechanism for preventing the operation of a key when the power is off. In this form a solenoid 196 is connected in the electrical circuit in the same manner as the solenoid 189 heretofore described. This solenoid is pivotally connected by a lost motion connection 197 with a pivoted lever 198 which enters one of the notches 173 in the guide member 170 and is normally held in its lowermost position between the balls 174 in the race or groove 173 by a spring 199 interposed between the lever and a pin 200 carried by the guide 170. Thus the lever 198 normally serves to occupy the free space in the ball race 173 and prevents the actuation of any of the keys 60.

In this form the energization of the motor circuit by the closing of the switch 188 energizes the solenoid 196 which, in turn, raises the locking lever 198 about its pivot (not shown) from the full line position to the dotted line position shown in Fig. 14. When the lever is in its dotted line position, it is withdrawn from the ball race 173, thus freeing the race to permit the actuation of any key lever 60 as desired.

I have also provided a mechanism to prevent the actuation of a key after a predetermined length of line has been printed. In other words, I have provided a mechanism to insure a predetermined margin at the right hand edge of the printed sheet. I accomplish this by preventing the operation of a key a predetermined distance before the right hand margin of the sheet W has been reached. As shown in the drawings, particularly in Figs. 1, 3, 4 and 15, I interpose a leaf switch 210 in one of the electrical conduits between the motor M and the solenoid 189 or 196 which operates the locking comb 180 or the locking lever 198 respectively to prevent the depression of a key.

The switch 210 is shown in Fig. 3 as being adjustably mounted on the frame bar 45 as, for instance, by being clamped thereto and held in position by a set screw 211. The switch 210 may comprise a leaf switch and is of the type which is normally closed. Secured to the bracket 42 of the left hand paper guide 41 (Fig. 4, or right hand guide in the remaining figures) is an arm 212 provided with an adjustable contact member 213. This contact is arranged to coact with the switch 210 and open the switch consequent upon engagement of the contact member 213 with an abutment 214 carried by the switch 210, as indicated in Figs. 1 and 3. This engagement follows consequent upon movement of the carriage in the direction of the arrows on Fig. 3. If desired, the bar 45 may be provided with a scale generally indicated in Fig. 3 at 216. This scale may be indexed in inches so that the switch 210 may be moved along the indicia on the scale indicating the width of the right hand margin desired on the sheet.

I claim:

1. In a keyboard operated machine, a plurality of manually depressible keys, a lever associated with each key, mechanism controlled by said levers, said levers being spaced from and parallel with each other, resilient means normally acting to retain said levers in their uppermost position, a comb positioned below and extending crosswise of said levers and into which said levers extend when depressed, an elongated channel in said comb, a series of balls in said channel, means to restrict endwise movement of the balls, there being one more ball than there are key levers, the total space between the balls being substantially the same as the width of one key lever whereby only one key lever may be depressed at a time, a second comb, resilient means to retain the second named comb in position to prevent entrance of the key levers into the first named comb to thereby prevent the depression of any key lever, and electrically actuated means to move said second named comb into registration with the first named comb.

2. In a keyboard operated machine, a plurality of manually depressible keys, a lever associated with each key, mechanism controlled by said levers, said levers being spaced from and parallel with each other, resilient means normally acting to retain said levers in their uppermost position, a comb positioned below and extending crosswise of said levers and into which said levers extend when depressed, an elongated channel in said comb, a series of balls in said channel, means to restrict endwise movement of the balls, there being one more ball than there are key levers and the total space between the balls being substantially the same as the width of one key lever whereby only one key lever may be depressed at a time, a second comb mounted for transverse movement on said first named comb, resilient means tending to draw said combs out of registration with each other whereby all of said key levers are prevented from entering said first named comb, a solenoid, a connection between the solenoid and said second named comb, an electric motor for operating said mechanism, a source of power for said motor, and means connecting said solenoid with said source of power whereby the keys may be depressed when the power is applied to said motor.

CLIFTON CHISHOLM.

REFERENCES CITED

The following references are of record in the file of this patent:

UNITED STATES PATENTS

| Number | Name | Date |
|---|---|---|
| 1,655,186 | Hokanson | Jan. 3, 1928 |
| 2,093,545 | Bryce et al. | Sept. 21, 1937 |
| 2,165,224 | Chisholm | July 11, 1939 |
| 2,191,706 | Cooke | Feb. 27, 1940 |
| 2,252,004 | Helmond | Aug. 12, 1941 |
| 2,255,030 | Tholstrup | Sept. 2, 1941 |